United States Patent
Girard et al.

(10) Patent No.: US 10,248,589 B2
(45) Date of Patent: Apr. 2, 2019

(54) INTEGRATED CIRCUIT WITH A SERIAL INTERFACE

(71) Applicant: Dialog Semiconductor (UK) Limited, London (GB)

(72) Inventors: Olivier Girard, Munich (DE); Joao Paulo Trierveiler Martins, Graz (AT); Daniele Giorgetti, Munich (DE); Philip Todd, Box (GB)

(73) Assignee: Dialog Semiconductor (UK) Limited, London (GB)

( * ) Notice: Subject to any disclaimer, the term of this patent is extended or adjusted under 35 U.S.C. 154(b) by 123 days.

(21) Appl. No.: 15/235,190

(22) Filed: Aug. 12, 2016

(65) Prior Publication Data

US 2017/0153990 A1    Jun. 1, 2017

(30) Foreign Application Priority Data

Nov. 30, 2015    (DE) .................. 10 2015 223 786

(51) Int. Cl.
| | |
|---|---|
| G06F 12/0862 | (2016.01) |
| G06F 13/16 | (2006.01) |
| G06F 13/40 | (2006.01) |

(52) U.S. Cl.
CPC ...... *G06F 13/1689* (2013.01); *G06F 12/0862* (2013.01); *G06F 13/4027* (2013.01); *G06F 13/4068* (2013.01); *G06F 2212/602* (2013.01); *Y02D 10/13* (2018.01); *Y02D 10/14* (2018.01); *Y02D 10/151* (2018.01)

(58) Field of Classification Search
None
See application file for complete search history.

(56) References Cited

U.S. PATENT DOCUMENTS

| | | | | |
|---|---|---|---|---|
| 5,664,142 A | * | 9/1997 | Boldt | G06F 13/28 710/22 |
| 5,761,464 A | * | 6/1998 | Hopkins | G06F 13/4018 710/306 |
| 5,987,530 A | | 11/1999 | Thomson | |

(Continued)

OTHER PUBLICATIONS

German Office Action, File No. 10 2015 223 786.9, Applicant: Dialog Semiconductor (UK) Limited, dated Aug. 18, 2016, 6 pgs, and English language translation, 6 pgs.

*Primary Examiner* — Elias Mamo
(74) *Attorney, Agent, or Firm* — Saile Ackerman LLC; Stephen B. Ackerman

(57) ABSTRACT

An integrated circuit coupled to an external serial bus is presented. A method for prefetching data from an external serial bus is presented. The integrated circuit comprises a serial interface, a data cache, and a prefetch control unit. The serial interface detects a data address on the serial bus and reads data elements from data storage units. The data storage units may be internal or external to the integrated circuit. The data cache is coupled to the serial interface via an internal bus. The prefetch control unit instructs the serial interface to prefetch a data element associated with the data address by reading the data element from a target data storage unit associated with the data address. The data element and the data address are written to the data cache. When a read request is detected, the data element can be quickly accessed from the data cache.

28 Claims, 3 Drawing Sheets

(56) References Cited

U.S. PATENT DOCUMENTS

| | | | |
|---|---|---|---|
| 7,130,933 B2* | 10/2006 | Bissessur | G06F 13/28 710/22 |
| 2001/0054852 A1* | 12/2001 | Nakamura | H02K 9/06 310/58 |
| 2004/0054852 A1* | 3/2004 | Nain | G06F 12/0862 711/137 |
| 2005/0081014 A1* | 4/2005 | Tran | G06F 12/0215 711/213 |
| 2015/0199292 A1* | 7/2015 | Lum | G06F 13/4221 710/315 |
| 2015/0268678 A1* | 9/2015 | Yu | G05F 1/46 327/540 |

* cited by examiner

INTEGRATED CIRCUIT WITH A SERIAL INTERFACE

TECHNICAL FIELD

This document relates to an integrated circuit with a serial interface for communicating with an external serial bus and methods for operating such an integrated circuit. Specifically, the document relates to an integrated circuit with a serial interface, wherein the serial interface is responsible for executing a read access and forwarding data elements to a host system via the external serial bus.

BACKGROUND

A serial interface is often used in integrated circuits to establish communication with a host system over a serial bus. Typically, communication over the serial bus is standardized by a serial message protocol, such as e.g. the Inter-Integrated Circuit $I^2C$ protocol. Inside the integrated circuit, the serial message protocol is often decoded into some form of internal read or write access on an internal bus that are caused by a received message. An internal read access must complete before the first bit of data is expected to appear on the serial interface according to the serial message protocol used. Depending on which register or device is concerned by the read access, the read access may take a different number of clock cycles to complete. For example, a slow memory or slow IO port may cause a violation of timing constraints of the serial message protocol. Moreover, the read access may even be forwarded by the integrated circuit to a device which is external to the integrated circuit and connected with the latter via a bridge. In this case, a violation of the timing constraints is almost unavoidable and an efficient mechanism is needed to avoid degradation of the system performance.

If it isn't possible to meet the timing constraints of the serial message protocol, the data transfer on the external serial bus must be extended using some form of wait state mechanism. Alternatively, the clock cycle of the host system may be stretched or a negative acknowledgement NACK signal must be returned form the integrated circuit to the host system, indicating that the access attempt has failed. In any case, the whole system is slowed down and the overall performance deteriorated.

SUMMARY

The present disclosure provides an integrated circuit coupled to an external serial bus. The integrated circuit comprises a serial interface, a data cache, and a prefetch control unit. The serial interface may be configured to read data elements from one or more data storage units. The serial interface is configured to detect a data address on the serial bus. The data address may be received from a host via the serial bus in a first message associated with a read request. The data cache is coupled to the serial interface via an internal bus. The prefetch control unit is configured to instruct the serial interface to prefetch a data element associated with the data address by reading the data element from a target data storage unit associated with the data address and write both the data element and the data address in the data cache, or at least cause such operations.

The serial interface may be e.g. an interface compliant to the Inter-Integrated Circuit $I^2C$ protocol. The proposed integrated circuit may exploit the characteristics of certain serial message protocols, such as e.g. the $I^2C$ protocol. Specifically, according to the $I^2C$ protocol, a data address may appear on the serial bus several bus cycles before the start of a corresponding data read phase. During this time, the requested data element may be read (prefetched) from the target data storage unit and stored for later use in the data cache, where it is kept available and is accessible in a short access time without the need to access the target data storage unit (having a longer access time).

At a later point in time, the serial interface may detect a read request associated with the data address on the external serial bus, e.g. received in a subsequent message. By transmitting a read request to the integrated circuit, the host system may request the integrated circuit to read the data element associated with the particular data address (as already received before in the first message on the eternal serial bus) and forward the data element to the host system. The serial interface may then initiate an internal read access on the internal bus addressed to the data storage unit associated with the data address to read the corresponding data element. The data cache may be configured to detect this read access on the internal bus associated with the data address and transmit, responsive to detecting the read access, the data element to the serial interface. This procedure is denoted as cache hit. The data cache may compare the data address for which the data element has been prefetched and the data address associated with the read access, and if the data addresses are identical, transmit the data element to the serial interface. The serial interface may be configured to forward the requested data element received from the data cache to the external serial bus.

Since the data element is stored at the (fast responding) data cache coupled to the serial interface via the internal bus, the data element is available immediately for output on the serial bus and a second read operation on the target data storage unit is not necessary. Since the read access of the data element was already started when the data address was seen in the first message, it has a longer time to complete and, thus, the described prefetch operation reduces the likelihood of failed or slow serial interface read accesses on the integrated circuit. As already discussed in the previous section, failed serial interface read accesses may e.g. result in NACK signals and slow serial interface read accesses may require undesired stretching of clock rates or additional wait states and may slow down the entire system.

Data storage units may comprise various devices such as e.g. volatile or non-volatile memories, IO ports, analog-to-digital ADC converters, temperature sensors, or other devices for storing data elements which may be read by the serial interface and forwarded to the host system via the serial bus. In other words, data storage units are not necessarily limited to classical random access memories RAM or flash memories, but may comprise devices which generate and temporarily store data elements which are of interest to the host system. In any case, a data storage unit may be addressed e.g. with a register address, and in response provides the requested data element on the internal bus.

The serial interface may determine, using e.g. a memory map, the target data storage unit associated with a certain data address. At this, the target data storage unit may be located on the integrated circuit and may be coupled with the serial interface via the internal bus. For example, the serial interface may be a bus master of the internal bus and the target data storage unit may be a bus slave of the internal bus. Alternatively, the target data storage unit may be coupled to the data cache via a bridge. The bridge, in turn, may act as bus master of a second internal bus, and several data storage units including the target data storage unit may be connected to the second internal bus as bus slaves. Moreover, it is even possible that the target data storage unit is external to the integrated circuit and coupled to the data cache via a bridge. Further, an external target data storage may be attached via the bridge to an external communication interface, such as for example an interface compliant to the System Power Management Interface SPMI specification. In this case, the prefetch request may actually trigger an access across the external communication interface in order to populate the data cache.

As a consequence, the access times or turnaround times of read accesses to the individual data storage device may vary depending on the type of the data storage device as well as on the communication path which couples the target data storage device with the serial interface.

The prefetch control unit may be configured to compare the data address with a set of predetermined data addresses and to determine whether to prefetch the corresponding data element based on the comparison result. Specifically, the prefetch control unit may be configured to not instruct the serial interface to prefetch the data element in case the data address belongs to the set of predetermined data addresses. Moreover, the prefetch control unit may be configured to not instruct the serial interface to prefetch the data element in case reading data from the target data storage unit by the serial interface involves a turnaround time which is shorter than a predetermined threshold turnaround time. The predetermined threshold turnaround time may be based on a maximum response time defined by a message protocol of the external serial bus. That is, the set of predetermined data addresses may correspond to "fast" data storage devices whose turnaround time is shorter than the predetermined threshold turnaround time.

The proposed integrated circuit may differentiate between so-called "slow" and "fast" data storage units. The prefetch operation may only be performed for "slow" data storage units, i.e. when it is necessary to perform a prefetch operation to meet the timing constraints imposed by the message protocol of the serial bus. An advantage of this approach is that redundant bus cycles on the internal bus are avoided. As a consequence, the power consumption of the integrated circuit is reduced and the maximum bandwidth of the internal bus is increased. Moreover, the likelihood of signal integrity related errors is reduced.

The prefetch control unit may be part of the serial interface or may be located at a different unit within the integrated circuit. In the latter case, the prefetch control unit may be coupled with serial interface via the internal bus or another dedicated communication interface. In any case, the serial interface may transmit the data address detected on the serial bus to the prefetch control unit. The prefetch control unit may then compare the detected data address with address or address ranges stored in the prefetch control unit. For this purpose, the set of predetermined data addresses may be stored using corresponding look-up tables LUT. If the prefetch control unit decides that a prefetch operation for the data address shall be carried out, it may instruct the serial interface to do so by transmitting a prefetch hit message to the serial interface. If the prefetch control unit decides that a prefetch operation for the data address shall not be carried out, it may instruct the serial interface to refrain from performing a prefetch operation by transmitting a prefetch invalidate message to the serial interface. Alternatively, a different kind of signaling mechanism between the prefetch control unit and the serial interface may be used.

The prefetch control unit may be configured to instruct, responsive to a read request on the external serial bus, the serial interface to prefetch a further data element associated with an incremented/decremented data address by reading the further data element from a target data storage unit associated with the incremented/decremented data address. To this end, the serial interface may inform the prefetch control unit about the read request from the serial bus, e.g. transmitting the incremented/decremented data address to the prefetch control unit. Further, the prefetch control unit may be configured to instruct the serial interface to write both the further data element and the incremented/decremented data address in the data cache. Thus, the prefetch control unit makes it possible to prefetch the further data element in case an address auto-increment protocol is used for reading data from the serial interface in a burst read. The prefetching of the further data element may take place in parallel to the output of previous data elements from the data cache or a target data storage unit in response to the detected read request.

The prefetch control unit may be configured to instruct, responsive the read request on the external serial bus, the serial interface to not prefetch the further data element in case the incremented/decremented data address belongs to the set of predetermined data addresses. Alternatively, the prefetch control unit may be configured to not instruct, responsive the read request on the external serial bus, the serial interface to prefetch the further data element in case the incremented/decremented data address belongs to the set of predetermined data addresses.

The integrated circuit may be a power management integrated circuit PMIC configured for supplying electrical power to different subsystems of an electronic device.

According to another aspect of the present disclosure, a method for prefetching data in an integrated circuit with a serial interface and a data cache is proposed. The method comprises a step of detecting, by the serial interface, a data address embedded in a first message sequence on an external serial bus. A data element associated with the data address is read from a data storage unit associated with the data address and both the data element and the data address are written to the data cache. The method further comprises a step of reading the data element from the data cache in case a read request associated with the data address is detected in a subsequent message sequence on the external serial bus. Finally, the data element is forwarded to the external serial bus.

The subsequent message sequence may appear later than the first message sequence on the external serial bus. Moreover, both sequences are not overlapping. The first message sequence may not comprise a read request for reading data elements from the integrated circuit. In other words, the data address contained in the first message sequence may not be related to a read request but may serve a different purpose such as e.g. a write request. Moreover, the subsequent message sequence may not comprise a data address. Instead, the subsequent message sequence may be associated with the preceding first message sequence, in which the data address was contained.

Moreover, the data element may only be read from the data storage unit if reading the data element from the data storage unit would involve a turnaround time which is longer than a predetermined threshold turnaround time. Alternatively, the data element may only be read from the data storage unit if the data address belongs to a set of predetermined data addresses. Put in a different way, the set of predetermined data addresses may correspond to "slow" data storage devices whose turnaround time is longer than the predetermined threshold turnaround time.

The proposed integrated circuit may further detect target boundary crossing during a burst access, automatically flush the data cache and redirect the prefetch to a new target data storage unit. In variations of the present invention, further intelligence may be added to the prefetch lookup function to detect boundary crossing in remote busses during a burst access. An automatically incremented address may cross the boundary separating one data storage unit from another in the memory map. The prefetch lookup table may be checked to detect this, the cache may be flushed and a prefetch may be started to the new target data storage unit.

Furthermore, a single word data cache or a block data cache or caches could be implemented. If the data address is transmitted in a most significant bit (msb) fashion first, then the block data cache read could begin before the final least significant (ls) bits of the data address have been received.

It should be noted that the methods and apparatuses including its preferred embodiments as outlined in the present document may be used stand-alone or in combination with the other methods and apparatuses disclosed in this document. In addition, the features outlined in the context of an apparatus are also applicable to a corresponding method. Furthermore, all aspects of the methods and apparatuses outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein FIG. 1 schematically illustrates an integrated circuit with a serial interface.

DESCRIPTION

Figure 1:
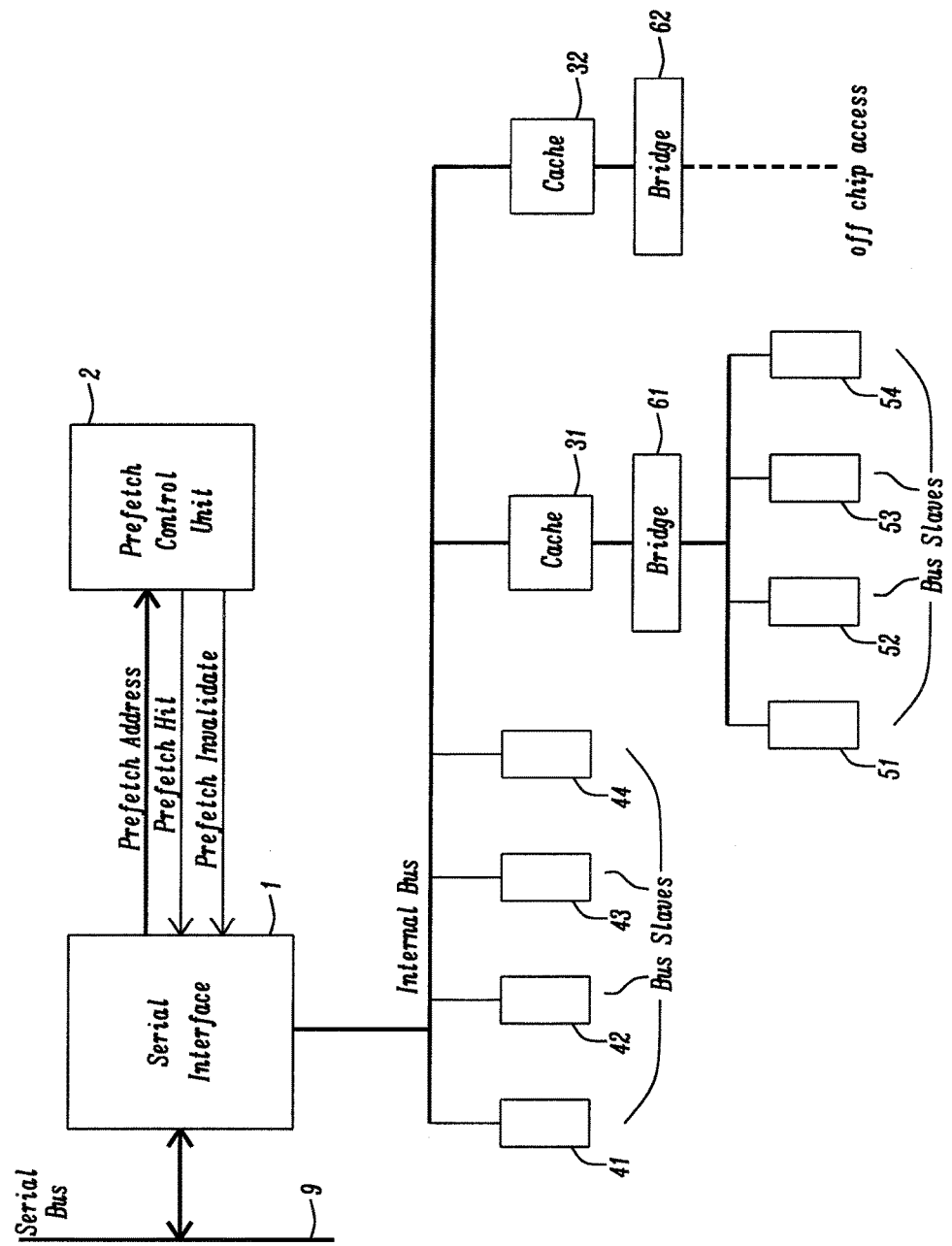

FIG. 1 schematically illustrates an exemplary integrated circuit with a serial interface 1. In FIG. 1, all illustrated circuit components with the exception of the serial bus 9 may be part of the proposed integrated circuit. The example circuit displayed in FIG. 1 comprises a prefetch control unit 2 and two data caches 31, 32. The two data caches 31, 32 are coupled to the serial interface 1 through an internal bus 7. Moreover, a first group of data storage units 41, 42, 43, 44 is directly coupled to the internal bus 7. In the illustrated example, the serial interface 1 acts as bus master of the internal bus 7, whereas the data storage units 41, 42, 43, 44 and the two data caches 31, 32 act as bus slaves. In addition, a second group of data storage units 51, 52, 53, 54 is coupled to the data cache 31 through a bridge 61 and a further internal bus 8. Again, bridge 61 may coordinate communication on the further internal bus 8 as a bus master, and the second group of data storage units 51, 52, 53, 54 may act as bus slaves. Further data storage units which are not illustrated in FIG. 1 may be external to the integrated circuit. For example, external data storage units may be coupled to data cache 32 via bridge 62.

Figure 2:
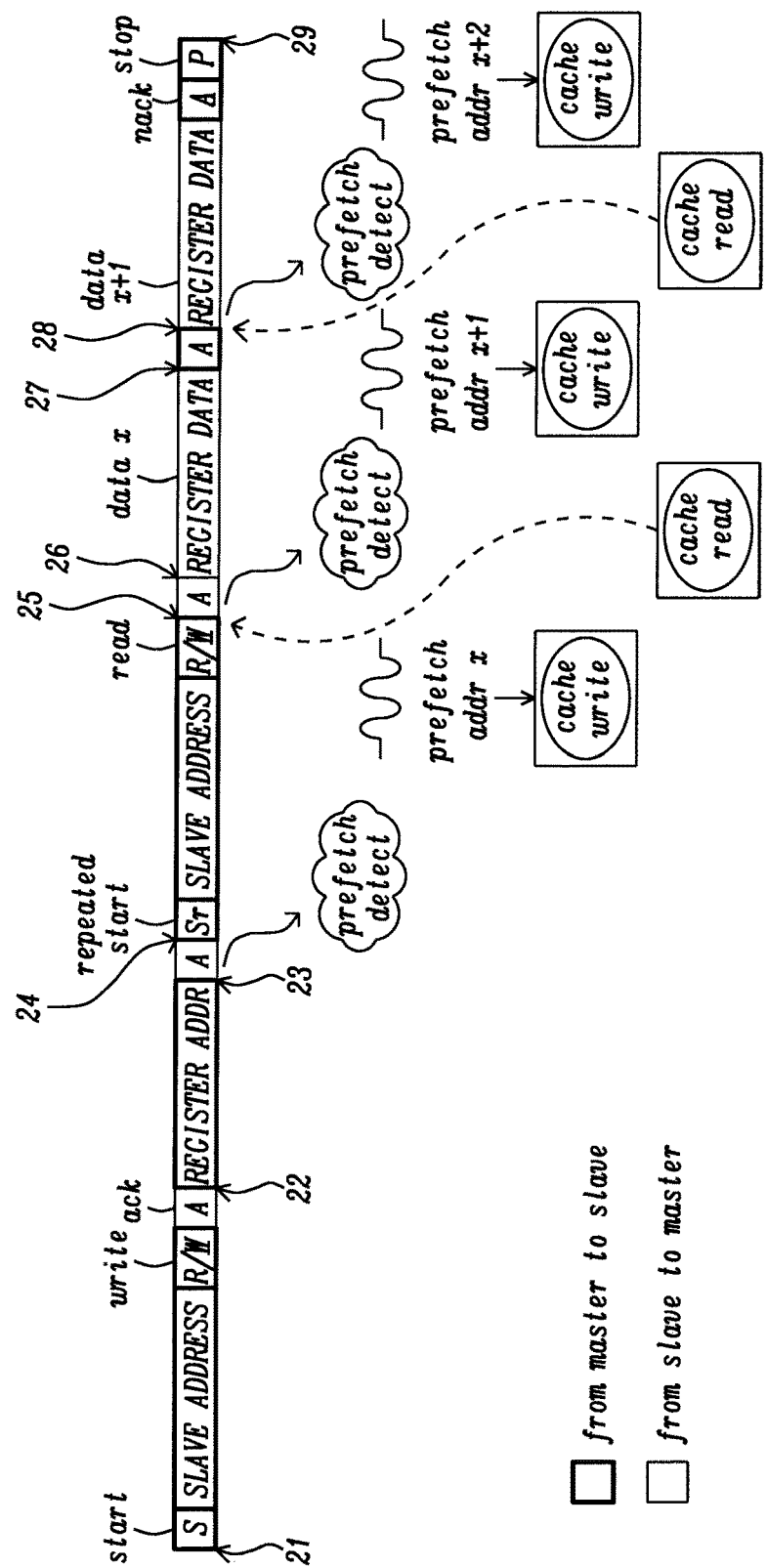
FIG. 2 illustrates an exemplary message sequence according to a serial message protocol.
Figure 3:
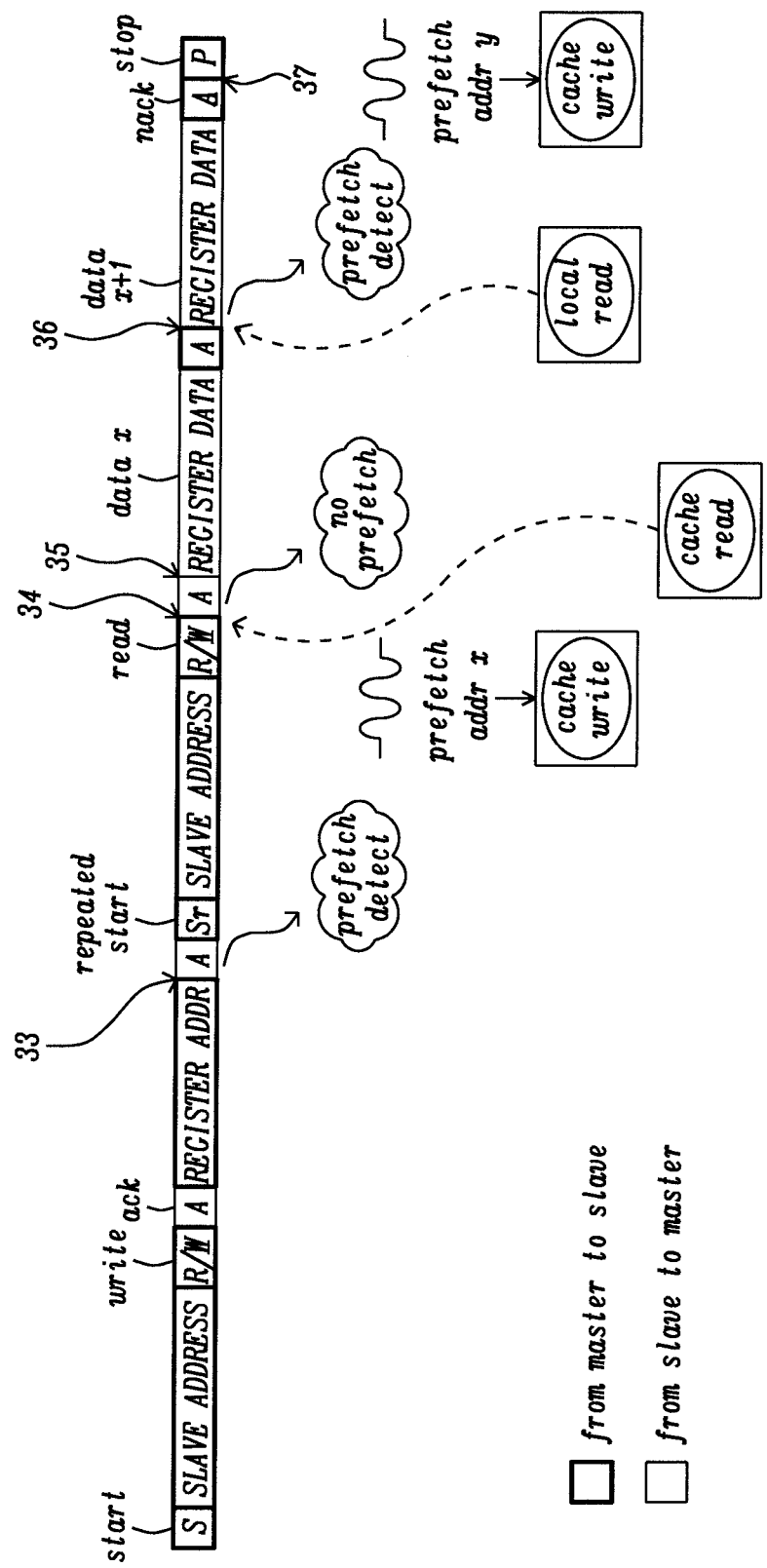
FIG. 3 illustrates another exemplary message sequence according to a serial message protocol.

FIGS. 2 and 3 illustrate exemplary message sequences according to a serial message protocol implemented on the serial bus 9 in FIG. 1. The illustrated exemplary message sequences are compliant with the Inter-Integrated Circuit $I^2C$ protocol. According to the $I^2C$ protocol, the integrated circuit coupled to the external serial bus 9 may take a role as a master node or a slave node. A master node may generate a clock and initiate communication with slave nodes. A slave node may receive the clock and respond when addressed by a master node. In the illustrated example, a host system acts as master node and communicates with the serial interface 1 of the integrated circuit, which acts as slave node. In other words, the serial interface 1 is adapted to act (a) as slave node with respect to the serial $I^2C$ protocol on the serial bus 9 and (b) as bus master with respect to the internal bus 7.

In FIGS. 2 and 3 messages which are transmitted from the host system acting as master node to the serial interface 1 acting as slave node are indicated by bold rectangles. Messages which are transmitted from the serial interface 1 acting as slave node to the host system acting as master node are indicated by dashed rectangles.

FIG. 2 illustrates a message sequence for a register read request using the I2C protocol. In a first sequence between time 21 and time 24, the master node carries out a write of a data address (denoted as register address in FIG. 2) in the slave node. After initiating the communication with a start message, the master node sends a slave node address, followed by a write request command, which is subsequently acknowledged by the slave node. The write request command may consist of a single R/W bit. From time 22 to time 23, the master node transmits the data address on the serial bus 9. At time 23, the last bit of the data address is received and the serial interface 1 detects the data address on the serial bus 9.

Triggered by this detection, the serial interface 1 forwards the detected data address to the prefetch control unit 2.

The prefetch control unit 2 compares the received data address with a list of data addresses or a range of data addresses to decide whether a prefetch operation is required or not. Data addresses stored at the prefetch control unit 2 may be organized e.g. in form of a look-up table LUT. In the example displayed in FIG. 2, the prefetch control unit 2 decides that a prefetch is necessary since the data address is e.g. associated with one of the data storage units 51, 52, 53, 54 of the second group or an external data storage unit. Reading data from the second group of data storage units 51, 52, 53, 54 or an external data storage unit may involve a turnaround time which is larger than a maximum response time dictated by the $I^2C$ protocol and a regular read access would thus violate the timing constraints of the serial protocol. By transmitting a prefetch hit message, the prefetch control unit 2 informs the serial interface 1 that a prefetch operation is required. Alternatively, a different way of signaling may be used.

Upon reception of the prefetch hit message, the serial interface 1 initiates prefetching a data element associated with the data address by reading the data element from the respective target data storage unit 51, 52, 53, 54 associated with the data address and writing both the data element and the data address in the data cache 31. In FIG. 2, the data address is denoted as x.

In the meanwhile, a second message sequence has started at time 24 with a repeated start message transmitted by the master node. In the following, the master node sends again the slave node address, followed by a read request command. Typically, the read request command consists of a single R/W bit. After the read request command is received at time 25, a cache hit at data cache 31 occurs. To be more specific, the data cache detects, e.g. by intercepting a bus read cycle on the internal bus 7, that the read access on the internal bus 7 is associated with the data address previously received between time 22 and time 23. The data cache transmits, responsive to detecting the read access, the data element to the serial interface 1. Subsequently, the serial interface 1 acknowledges receipt of the read request and forwards the data element received from data cache 31 to the external serial bus 9. In FIG. 2, the data element is denoted as register data.

In the illustrated example, the maximum response time for performing a read access is e.g. the time interval between times 25 and 26, i.e. the time interval between time 25 at which the read request is completely received to the time 26 when the first data bit of the data element needs to be output on the serial bus 9. This response time may be enough to perform a read operation from the data cache 31 or 32 in case the data element is prefetched from a data storage unit. In this way, the maximum available time for reading the data element from the data storage unit (i.e. performing the read access) is significantly extended. In total, the maximum available time extends from time 23 to time 25 and should be enough to prefetch the data element in a data cache 31, 32. At time 25, when the read request is completely detected on the external serial bus 9, the data element needs to be forwarded to the serial interface 1. Hence, it becomes possible to meet the timing constraints of the serial protocol.

Going back to time 25 in FIG. 2, while the data element is shifted on the serial bus 9, the serial interface 1 may attempt to initiate a further prefetch operation by guessing a further data address. In the displayed example, an address auto-increment protocol may be used to realize a burst read. Therefore, the serial interface 1 transmits, responsive to detecting the read request on the external serial bus 9 at time 25, an incremented, second data address to the prefetch control unit 2. The prefetch control unit 2 determines again that a prefetch operation is necessary and instructs the serial interface to initiate reading of a second data element from an external data storage unit associated with the second data address, and to write both the second data element and the second data address in the data cache 32.

At time 27, the master node acknowledges receipt of the data element by transmitting an acknowledgement message. According to the used address auto-increment protocol, the acknowledgement message must be interpreted as a second read request on the external serial bus 9 targeted at the second data element stored at the second, incremented data address. Since the second data element is already prefetched in the data cache 32, a cache hit occurs and the data element may be quickly transferred from the data cache 32 to the external serial bus 9.

At time 28, a third prefetch operation is initiated by the prefetch control unit 2. This time, however, a third data element stored at one of the data caches 31 and 32 is not forwarded to the serial interface 1 since the burst read is terminated by the master node with a NACK message.

If, during the second message sequence, the R/W bit would indicate a write request instead of the expected read request, the content of the corresponding data cache 31 or 32 may be invalidated. This could be done by the prefetch unit by using the internal bus 7 to write to a cache invalidate control register of either data cache 31 or 32. Similarly, after receiving the NACK message during the second message sequence, cache contents may be invalidated to avoid usage of the third data element.

FIG. 3 illustrates another exemplary message sequence. At times 33, 34 and 36, the prefetch control unit 2 has to decide whether a prefetch operation shall be carried out. At time 33, the prefetch control unit 2 decides that prefetching a data element associated with the data address (register address) is required, since reading the data element from a remote data storage device beginning at time 34 would not be completed at time 35. The prefetched data element (register data) is transmitted to the serial interface 1 via the internal bus 7 starting from time 35.

At time 34, the prefetch control unit 2 decides that prefetching a second data element associated with an incremented data address is not required. The incremented data address may be associated with a data storage device 41, 42, 43, 44 of the first group which is locally connected to the internal bus 7 and, hence, a prefetch is not required. As an advantage, the load on the internal bus 7 is reduced by only performing a prefetch operation if necessary. At time 36, the data element associated with the incremented data address is directly read from the corresponding data storage device 41, 42, 43, 44 by a bus read cycle on the internal bus 7.

Still at time 36, the prefetch control unit 2 decides that prefetching a third data element associated with a further incremented data address is required. This time, however, the third data element is stored in a data cache but remains unused since the burst read is terminated by the master node with a NACK message at time 37.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. An integrated circuit coupled to an external serial bus, the integrated circuit comprising
    a serial interface configured to act as a bus slave with regard to the external serial bus and to detect a data address on the external serial bus;
    a data cache coupled to the serial interface via an internal bus; and
    a prefetch control unit configured to instruct the serial interface to prefetch a data element associated with the detected data address by causing the data element to be read from a target data storage unit associated with the data address and the data element and the data address to be written in the data cache,
    wherein the prefetch control unit is configured to not instruct the serial interface to prefetch the data element in case reading data from the target data storage unit by the serial interface involves a turnaround time which is shorter than a predetermined threshold turnaround time; and wherein the predetermined threshold turnaround time is based on a maximum response time defined by a message protocol of the external serial bus.

2. The integrated circuit according to claim 1, wherein the prefetch control unit is configured to compare the data address with a set of predetermined data addresses and to determine whether to prefetch the corresponding data element based on the comparison result.

3. The integrated circuit according to claim 1, wherein the prefetch control unit is configured to not instruct the serial interface to prefetch the data element in case the data address belongs to a set of predetermined data addresses.

4. The integrated circuit according to claim 1, wherein the data cache is configured to detect, on the internal bus, a read access associated with the data address and transmit, responsive to detecting the read access, the data element to the serial interface, and the serial interface is configured to forward the data element from the data cache to the external serial bus.

5. The integrated circuit according to claim 1, wherein the prefetch control unit is configured to instruct, responsive to a read request on the external serial bus, the serial interface to prefetch a further data element associated with an incremented or decremented data address by reading the further data element from a target data storage unit associated with the incremented or decremented data address, and to write both the further data element and the incremented or decremented data address in the data cache.

6. The integrated circuit according to claim 5, wherein the prefetch control unit is configured to instruct, responsive to a read request on the external serial bus, the serial interface to not prefetch the further data element in case the incremented or decremented data address belongs to a set of predetermined data addresses.

7. The integrated circuit according to claim 1, wherein the integrated circuit comprises the target data storage unit.

8. The integrated circuit according to claim 1, wherein the target data storage unit is coupled to the serial interface via the internal bus.

9. The integrated circuit according to claim 8, wherein the serial interface is a bus master of the internal bus and the target data storage unit is a bus slave of the internal bus.

10. The integrated circuit according to claim 1, wherein the target data storage unit is coupled to the data cache via a bridge.

11. The integrated circuit according to claim 1, wherein the target data storage unit is external to the integrated circuit and coupled to the data cache via a bridge.

12. The integrated circuit according to claim 1, wherein the integrated circuit is a power management integrated circuit PMIC configured for supplying electrical power to different subsystems of an electronic device.

13. A method for prefetching data in an integrated circuit with a serial interface and a data cache, wherein the serial interface acts as a bus slave with regard to an external serial bus, the method comprising:
detecting, by the serial interface, a data address embedded in a first message sequence on the external serial bus;
reading a data element associated with the data address from a data storage unit associated with the data address;
writing both the data element and the data address to the data cache;
detecting a read request associated with the data address on the external serial bus, the read request being embedded in a subsequent message sequence;
transmitting, responsive to detecting the read request, the data element from the data cache to the serial interface; and
forwarding the data element to the external serial bus,
wherein the data element is only read from the data storage unit if reading the data element from the data storage unit would involve a turnaround time which is longer than a predetermined threshold turnaround time; and
wherein the predetermined threshold turnaround time is based on a maximum response time defined by a message protocol of the external serial bus.

14. The method according to claim 13, wherein the data element is only read from the data storage unit if the data address belongs to a set of predetermined data addresses.

15. The method according to claim 13, wherein the first message sequence does not comprise a read request.

16. The method according to claim 13, wherein the subsequent message sequence does not comprise a data address.

17. A method for coupling an integrated circuit to an external serial bus, comprising the steps of:
detecting a data address on the external serial bus via a serial interface, wherein the serial interface acts as a bus slave with regard to the external bus;
coupling a data cache to the serial interface via an internal bus; and
instructing the serial interface with a prefetch control unit to prefetch a data element associated with the detected data address by causing the data element to be read from a target data storage unit associated with the data address and the data element and the data address to be written in the data cache
wherein the prefetch control unit does not instruct the serial interface to prefetch the data element in case reading data from the target data storage unit by the serial interface involves a turnaround time which is shorter than a predetermined threshold turnaround time; and
wherein the predetermined threshold turnaround time is based on a maximum response time defined by a message protocol of the external serial bus.

18. The method according to claim 17, further comprising the steps of:
comparing by the prefetch control unit the data address with a set of predetermined data addresses, and
determining by the prefetch control unit whether to prefetch the corresponding data element based on the comparison result.

19. The method according to claim 17, wherein the prefetch control unit does not instruct the serial interface to prefetch the data element in case the data address belongs to a set of predetermined data addresses.

20. The method according to claim 17, wherein the data cache detects, on the internal bus, a read access associated with the data address and transmit, responsive to detecting the read access, the data element to the serial interface, and the serial interface forwards the data element from the data cache to the external serial bus.

21. The method according to claim 17, wherein the prefetch control unit instructs, responsive to a read request on the external serial bus, the serial interface to prefetch a further data element associated with an incremented or decremented data address by reading the further data element from a target data storage unit associated with the incremented or decremented data address, and to write both the further data element and the incremented or decremented data address in the data cache.

22. The method according to claim 21, wherein the prefetch control unit instructs, responsive to a read request on the external serial bus, the serial interface to not prefetch the further data element in case the incremented or decremented data address belongs to a set of predetermined data addresses.

23. The method according to claim 17, wherein the integrated circuit comprises the target data storage unit.

24. The method according to claim 17, wherein the target data storage unit is coupled to the serial interface via the internal bus.

25. The method according to claim 24, wherein the serial interface is a bus master of the internal bus and the target data storage unit is a bus slave of the internal bus.

26. The method according to claim 17, wherein the target data storage unit is coupled to the data cache via a bridge.

27. The method according to claim 17, wherein the target data storage unit is external to the integrated circuit and coupled to the data cache via a bridge.

28. The method according to claim 17, wherein the integrated circuit is a power management integrated circuit PMIC for supplying electrical power to different subsystems of an electronic device.

* * * * *